(12) United States Patent
Brown et al.

(10) Patent No.: US 11,021,098 B1
(45) Date of Patent: Jun. 1, 2021

(54) ILLUMINATING VEHICLE CLOSURE MEMBER SYSTEMS FOR PROVIDING EXTERIOR LIGHTING EFFECTS

(71) Applicant: FORD GLOBAL TECHNOLOGIES, LLC, Dearborn, MI (US)

(72) Inventors: Kristopher Karl Brown, Dearborn, MI (US); Larry Dean Elie, Ypsilanti, MI (US); Evangelos P. Skoures, Detroit, MI (US); Stuart C. Salter, White Lake, MI (US); Howard Paul Tsvi Linden, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/987,463

(22) Filed: Aug. 7, 2020

(51) Int. Cl.
| | | |
|---|---|---|
| *B60Q 1/32* | (2006.01) |
| *B60Q 1/00* | (2006.01) |
| *B60Q 1/26* | (2006.01) |
| *F21W 104/00* | (2018.01) |
| *F21W 105/00* | (2018.01) |
| *H05B 47/115* | (2020.01) |

(52) U.S. Cl.
CPC ........... *B60Q 1/323* (2013.01); *B60Q 1/0023* (2013.01); *B60Q 1/2669* (2013.01); *B60Q 1/268* (2013.01); *B60Q 1/32* (2013.01); *B60Q 2400/30* (2013.01); *B60Q 2400/40* (2013.01); *B60Q 2400/50* (2013.01); *F21W 2104/00* (2018.01); *F21W 2105/00* (2018.01); *H05B 47/115* (2020.01)

(58) Field of Classification Search
CPC ........ B60Q 1/2669; B60Q 1/24; B60Q 1/268; B60Q 1/302; B60Q 1/32; B60Q 1/323; B60Q 1/50; B60Q 1/503; B60Q 2400/00; B60Q 2400/40; B60Q 2400/50; B60Q 2400/30; F21W 2102/40; F21W 2103/60; F21W 2104/00; F21W 2105/00
See application file for complete search history.

(56) References Cited

U.S. PATENT DOCUMENTS

| | | | |
|---|---|---|---|
| 10,137,831 B1* | 11/2018 | Salter | B60Q 3/62 |
| 10,532,692 B2* | 1/2020 | Hundt | B60Q 1/268 |
| 2015/0175060 A1* | 6/2015 | Salter | B60Q 1/0035 362/510 |
| 2016/0258591 A1* | 9/2016 | Salter | F21S 43/237 |
| 2017/0032599 A1* | 2/2017 | Elie | G06F 21/00 |
| 2017/0130510 A1 | 5/2017 | Nania et al. | |
| 2017/0210282 A1* | 7/2017 | Rodriguez Barros | B60Q 1/484 |
| 2017/0371032 A1* | 12/2017 | Koelsch | G01S 13/62 |
| 2018/0065537 A1* | 3/2018 | Abrams | B60Q 1/24 |
| 2018/0201184 A1* | 7/2018 | Lay | F21S 43/19 |

(Continued)

*Primary Examiner* — Alexander K Garlen
*Assistant Examiner* — Colin J Cattanach
(74) *Attorney, Agent, or Firm* — David Coppiellie; Carlson, Gaskey & Olds

(57) ABSTRACT

This disclosure details illuminating vehicle closure member systems for selectively producing various exterior lighting effects. Exemplary closure member systems may include a closure member and a discrete illuminating section secured relative to the closure member and including a lighting module that is configured to produce at least one of a beltline lighting effect, a motion path lighting effect, or an operation status lighting effect at or near the closure member. A control module may control the various lighting effects emitted by the illuminating closure member system.

20 Claims, 11 Drawing Sheets

(56) References Cited

U.S. PATENT DOCUMENTS

| | | |
|---|---|---|
| 2018/0236972 A1 | 8/2018 | Linden et al. |
| 2019/0024869 A1* | 1/2019 | Salter ..................... F21S 43/14 |
| 2019/0078373 A1* | 3/2019 | Schulz ................ B60Q 1/0023 |
| 2019/0183697 A1* | 6/2019 | Salter ........................ G01S 7/51 |
| 2020/0217477 A1* | 7/2020 | Nicholson ................ B60Q 1/30 |
| 2020/0247312 A1* | 8/2020 | Ota ......................... E05B 81/00 |

* cited by examiner

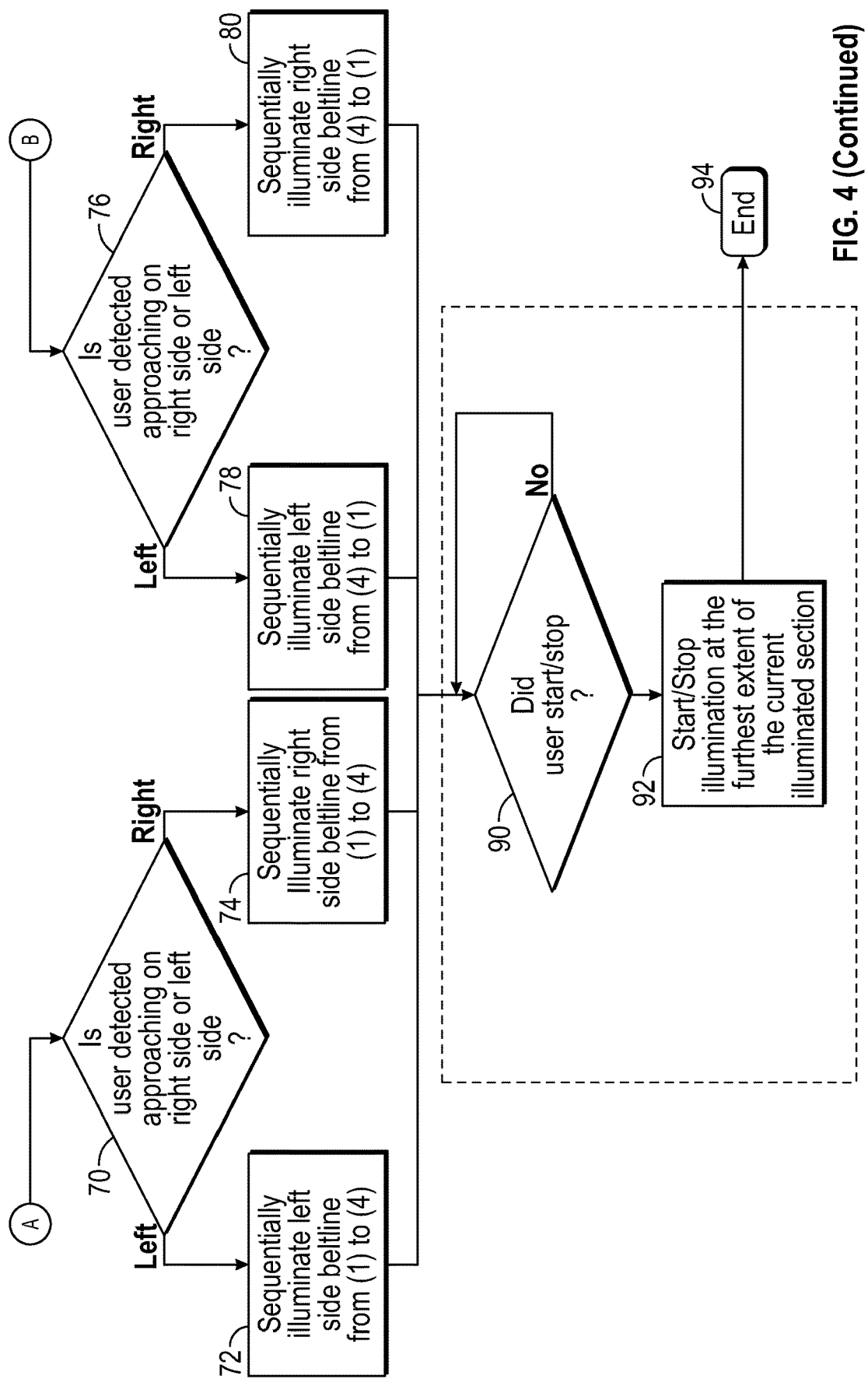

ILLUMINATING VEHICLE CLOSURE MEMBER SYSTEMS FOR PROVIDING EXTERIOR LIGHTING EFFECTS

TECHNICAL FIELD

This disclosure relates to motor vehicles, and more particularly to illuminating vehicle closure member systems configured for providing various vehicle exterior lighting effects, such as illuminated closure member beltlines, illuminated closure member operation status indications, illuminated closure member motion path indications, etc.

BACKGROUND

A vehicle can include one or more closure members. Exemplary closure members are doors and liftgates. Generally, closure members can move back and forth between open and closed positions relative to a body structure of the vehicle in order to provide vehicle ingress/egress. Some closure members can be moved with actuators, such as power hinges.

SUMMARY

An illuminating closure member system according to an exemplary aspect of the present disclosure includes, among other things, a closure member and a discrete illuminating section secured relative to the closure member and including a lighting module configured to illuminate a beltline of the closure member.

In a further non-limiting embodiment of the foregoing illuminating closure member system, the closure member is a vehicle side door.

In a further non-limiting embodiment of either of the foregoing illuminating closure member systems, a control module is configured to control the lighting module for illuminating the beltline when an authorized user is within a threshold range from the closure member.

In a further non-limiting embodiment of any of the foregoing illuminating closure member systems, an authorization sensor is in communication with the control module and configured to communicate with a personal electronic device of the user when the personal electronic device is within the threshold distance.

In a further non-limiting embodiment of any of the foregoing illuminating closure member systems, a positional sensor is in communication with the control module and is configured to detect a user gesture from the authorized user.

In a further non-limiting embodiment of any of the foregoing illuminating closure member systems, an object detection sensor is in communication with the control module and is configured to detect an object in a motion path of the closure member.

In a further non-limiting embodiment of any of the foregoing illuminating closure member systems, an actuator system is configured to move the closure member between a closed position and an open position.

In a further non-limiting embodiment of any of the foregoing illuminating closure member systems, the actuator system includes a power door actuator.

In a further non-limiting embodiment of any of the foregoing illuminating closure member systems, the discrete illuminating section includes the lighting module and a thermal transfer device positioned between the lighting module and a metallic component of the closure member.

In a further non-limiting embodiment of any of the foregoing illuminating closure member systems, the thermal transfer device includes a thermally conductive adhesive pad that facilitates heat transfer between a printed circuit board (PCB) of the lighting module and the metallic component.

In a further non-limiting embodiment of any of the foregoing illuminating closure member systems, the lighting module is configured to illuminate the beltline in order to indicate an operation status of the closure member.

In a further non-limiting embodiment of any of the foregoing illuminating closure member systems, the lighting module is configured to project an illuminated motion path that provides a visual indication of an expected path of motion of the closure member.

A vehicle according to another exemplary aspect of the present disclosure includes, among other things, a vehicle body, a closure member movably mounted relative to the vehicle body, an illuminating closure member system mounted to the closure member, and a control module configured to control the illuminating closure member system for producing at least one of a beltline lighting effect, a motion path lighting effect, or an operation status lighting effect associated with the closure member.

In a further non-limiting embodiment of the foregoing vehicle, the illuminating closure member system includes a lighting module and a thermal transfer device disposed between the lighting module and a metallic component of the closure member.

In a further non-limiting embodiment of either of the foregoing vehicles, the lighting module includes a diffuser lens, a plurality of light sources, and a printed circuit board (PCB). The thermal transfer device includes a thermally conductive adhesive pad that facilitates heat transfer between the PCB and the metallic component.

In a further non-limiting embodiment of any of the foregoing vehicles, the control module is configured to control the lighting module for producing the beltline lighting effect when an authorized user is within a threshold range from the vehicle.

In a further non-limiting embodiment of any of the foregoing vehicles, an authorization sensor is configured to communicate an input signal to the control module when the authorized user is within the threshold range.

In a further non-limiting embodiment of any of the foregoing vehicles, a reflective panel is configured to reflect the motion path lighting effect onto a ground surface adjacent the vehicle.

In a further non-limiting embodiment of any of the foregoing vehicles, the motion path lighting effect includes a logo, a sweeping illuminated line, or a colored illuminated line.

A method according to another exemplary aspect of the present disclosure includes, among other things, automatically illuminating at least a portion of a beltline of a closure member of a vehicle with an illuminating closure member system when an authorized user is within a threshold distance of the vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details illuminating vehicle closure member systems for selectively producing various exterior lighting effects. Exemplary closure member systems may include a closure member and a discrete illuminating section secured relative to the closure member and including a lighting module that is configured to produce at least one of a beltline lighting effect, a motion path lighting effect, or an operation status lighting effect at or near the closure member. A control module may control the various lighting effects emitted by the illuminating closure member system. These and other features of this disclosure are described in greater detail below.

Figure 1:
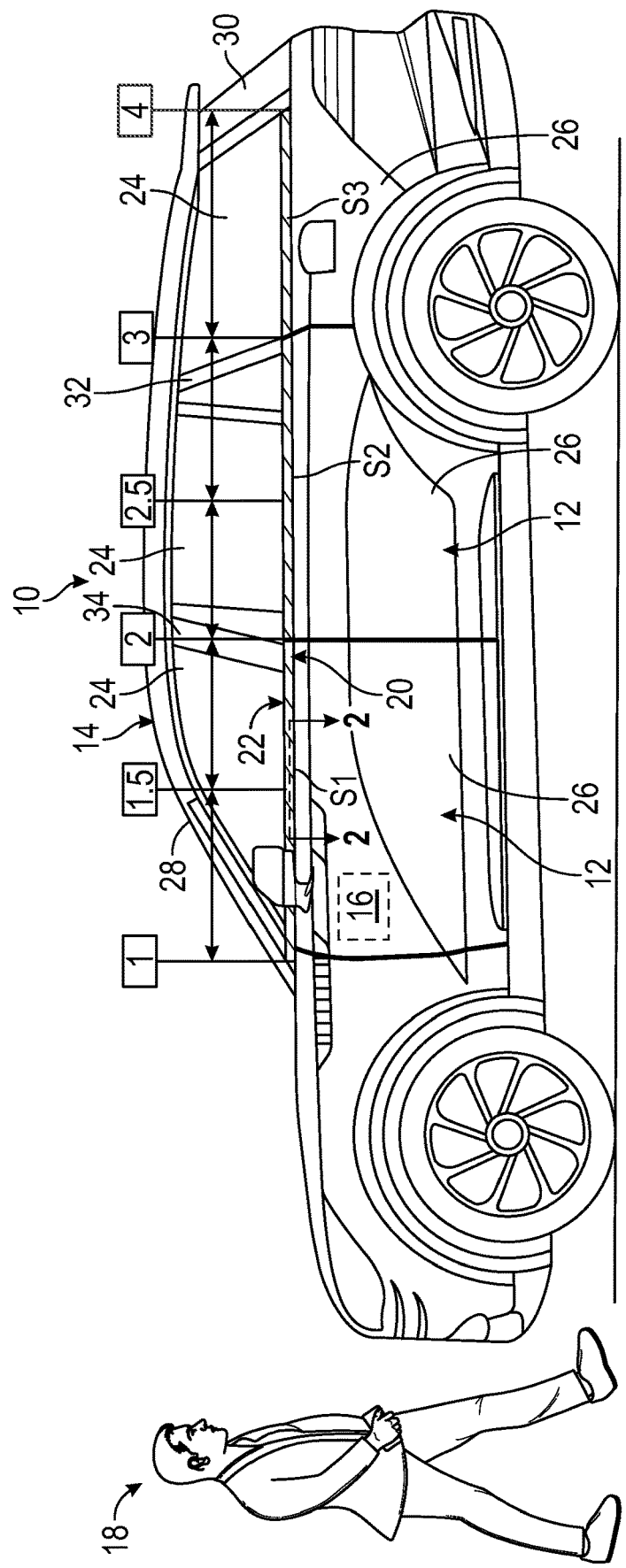
FIG. 1 illustrates a vehicle equipped with an illuminating closure member system.

FIG. 1 schematically illustrates a vehicle 10. The vehicle 10 may be a car, a truck, a van, a sport utility vehicle, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes various closure members 12 that are mounted relative to a vehicle body 14 and configured to move between closed and open positions for accessing a vehicle interior (e.g., a vehicle passenger cabin). In the illustrated embodiment, the closure members 12 are side doors of the vehicle 10. Other exemplary closure members include liftgates, tailgates, swing gates, etc.

One or more of the closure members 12 (here, a front side door) may be a powered door that includes an actuator system 16 configured to automatically move the closure member 12 when an authorized user 18 is within a predefined threshold distance from the vehicle 10 and has indicated a desire to enter the vehicle 10. In an embodiment, the actuator system 16 includes a power door actuator, such as a power door hinge, for example.

The vehicle 10 may further include an illuminating closure member system 20 that is secured to one or more of the closure members 12. In an embodiment, the illuminating closure member system 20 is secured to at least one of the closure members 12 and to another section of the vehicle body 14. The illuminating closure member system 20 may be positioned along a beltline 22 of the vehicle 10. The beltline 22 is generally located where bottom portions of glass panels 24 of the closure members 12 meet upper portions of body panels 26 of either the closure members 12 or another section of the vehicle body 14. In an embodiment, the beltline 22 extends from an A-pillar 28 to a D-pillar 30 of the vehicle 10. In another embodiment, the beltline 22 extends from the A-pillar 28 to a C-pillar 32 of the vehicle 10.

Because the closure members 12 are movable components of the vehicle 10, the illuminating closure member system 20 may include one or more discrete illuminating sections. In an embodiment, the illuminating closure member system 20 may include three discrete illuminating sections S1, S2, and S3. The discrete illuminating section S1 may extend from the A-pillar 28 to a B-pillar 34, the discrete illuminating section S2 may extend from the B-pillar to the C-pillar 32, and the discrete illuminating section S3 may extend from the C-pillar 32 to the D-pillar 30. However, the total number and configuration of the discrete illuminating sections of the illuminating closure member system 20 is not intended to limit this disclosure.

Although an illuminating closure member system 20 for left or driver side of the vehicle 10 is shown in FIG. 1, an additional illuminating closure member system could be provided on the right or passenger side of the vehicle 10. The vehicle 10 may therefore be equipped with multiple illuminating closure member systems (e.g., one at both sides of the vehicle 10).

The illuminating closure member system 20 may be part of an exterior lighting system of the vehicle 10. The illuminating closure member system 20 may be selectively controlled to emit various exterior lighting effects. As will be discussed in greater detail herein, the illuminating closure member system 20 may be operated to illuminate the beltline 22 or select portions thereof, to indicate a status of one or more of the closure members 12, to indicate a motion path of one or more of the closure members 12 when moving between closed and open positions, etc.

Figure 2:
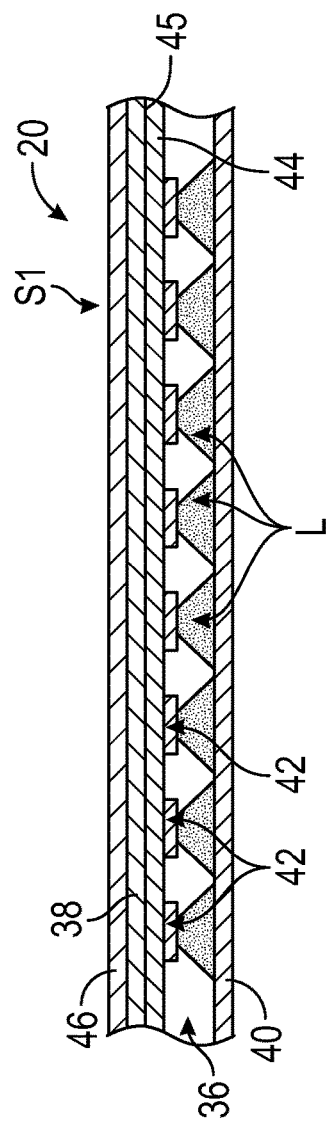
FIG. 2 is a cross-sectional view of the illuminating closure member system of FIG. 1.

FIG. 2 is a cross-sectional view through the discrete illuminating section S1 of the illuminating closure member system 20. Although the cross-sectional view of FIG. 2 is taken through the discrete illuminating section S1 of the illuminating closure member system 20 (see, e.g., section 2-2 of FIG. 1), the other discrete illuminating sections S2, S3 of the illuminating closure member system 20 could include substantially similar configurations.

In an embodiment, the discrete illuminating section S1 of the illuminating closure member system 20 includes a lighting module 36 and a thermal transfer device 38. The specific configuration of the lighting module 36 is not intended to limit this disclosure, however, in an exemplary embodiment, the lighting module 36 may include a diffuser lens 40, a plurality of light sources 42, and a printed circuit board (PCB) 44.

The diffuser lens 40 may be made of a light permeable material that permits light beams L from the light sources 42 to escape from the inside to the outside of the lighting module 36 for emitting various exterior lighting effects from the illuminating closure member system 20. The diffuser lens 40 may focus the light beams L emitted by the light sources 42, such as in a narrow pattern that can be emitted with a desired directionality through the diffuser lens 40.

Each light source 42 may be a light emitting diode (LED). In an embodiment, each light source 42 is a multi-colored LED, such as a Red, Green, Blue (RGB) LED, for example. Other light sources could also be utilized within the scope of this disclosure. The light sources 42 may be arranged on the PCB 44 in a spaced apart relationship. The PCB 44 may include a thin-walled glass-reinforced epoxy laminate panel 45 that is positioned in contact with the thermal transfer device 38.

The total number of light sources 42 provided within each lighting module 36 may vary and is a vehicle design dependent parameter. In an embodiment, the lighting module 36 of the illuminating closure member system 20 includes a sufficient number of light sources 42 for allowing visualization of the lighting effects emitted therefrom during both daytime conditions and nighttime conditions. The intensity of the light beams L emitted from each light source 42 can be varied to provide the lighting effects at the proper brightness during both daytime conditions and nighttime conditions.

The discrete illuminating section S1 may be mounted to a metallic component 46 of the vehicle body 14. In an embodiment, the metallic component 46 is a sheet metal panel of one of the closure members 12. In another embodiment, the metallic component 46 is part of a fender, quarter panel, or other body panel of the vehicle body 14. Heat generated by the light sources 42 of the lighting module 36 during a light emitting event may be dissipated into the metallic component 46. In this way, the metallic component 46 acts as a relatively large heat sink for thermally managing the light sources 42 and the PCB 44 of the lighting module 36.

The heat transfer device 38 may be disposed between the PCB 44 and the metallic component 46 once the discrete illuminating section S1 of the illuminating closure member system 20 is mounted to the metallic component 46. In an embodiment, the heat transfer device 38 is a thermally conductive adhesive pad. The heat transfer device 38 facilitates heat transfer between the PCB 44 (and thus the light sources 42) and the metallic component 46.

Figure 3:
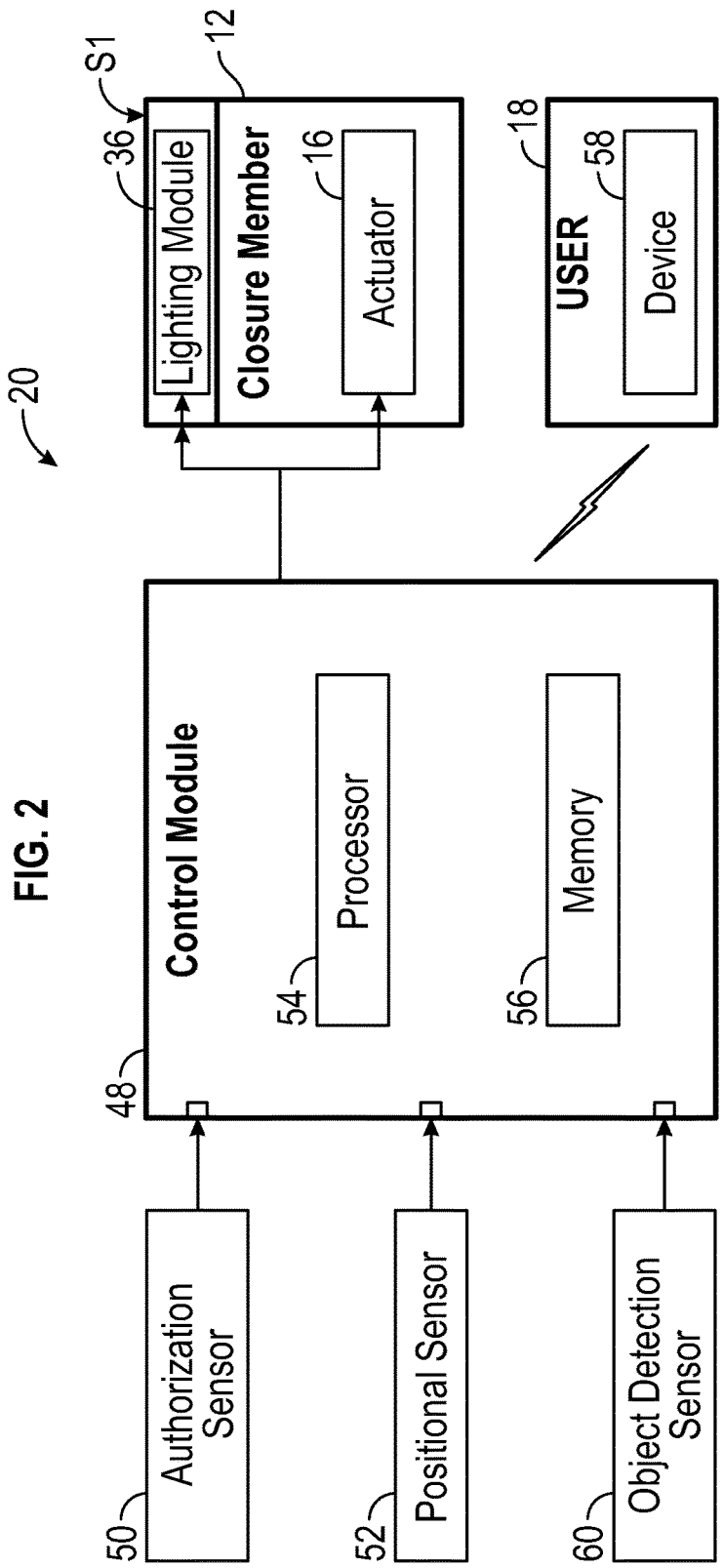
FIG. 3 is a block diagram further illustrating aspects of the illuminating closure member system of FIGS. 1 and 2 relative to a vehicle user.

Referring now to FIG. 3, with continued reference to FIGS. 1 and 2, the light sources 42 of each lighting module 36 of the illuminating closure member system 20 can be individually controlled to emit light, such as to produce various lighting effects, in response to commands from an illumination control module 48. The control module 48 may be operably connected to each lighting module 36, the actuator system 16 of at least one of the closure members 12, an authorization sensor 50, a positional sensor 52, and an object detection sensor 60. The control module 48 could further be operatively linked to additional actuator systems and sensors associated with additional closure members 12 of the vehicle 10.

The control module 48 may be equipped with executable instructions for interfacing with and commanding operation of various components of the illuminating closure member system 20, including but not limited to, the light sources 42 of each lighting module 36 and the actuator system 16 of the closure member 12. The control module 48 may include a processing unit 54 and non-transitory memory 56 for executing the various control strategies and modes of the illuminating closure member system 20 and the actuator system 16. The processing unit 54 can be programmed to execute one or more programs stored in the memory 56. The program may be stored in the memory 56 as software code, for example. Each program stored in the memory 56 may include an ordered list of executable instructions for implementing logical functions associated with the illuminating closure member system 20 and the actuator system 16. The processing unit 54 can be a custom made or commercially available processor, a central processing unit (CPU), or generally any device for executing software instructions. The memory 56 can include any one or combination of volatile memory elements and/or nonvolatile memory elements.

The authorization sensor 50 may be configured to communicate with a personal electronic device 58 of the user 18 when the personal electronic device 58 is within a threshold distance (e.g., about 2 meters) from the vehicle 10 in order to authenticate the user 18. In this disclosure, the term "about" means that the expressed quantities or ranges need not be exact but may be approximated and/or larger or smaller, reflecting acceptable tolerances, conversion factors, measurement error, etc. The personal electronic device 58 can be a key fob or a smartphone of the user 18, for example. The authorization sensor 50 and the personal electronic device 58 may communicate via wireless signals, such as Bluetooth Low Energy (BLE) signals, for example, to provide an indication, via an input signal, to the control module 48 that the personal electronic device 58 is near the vehicle 10 and to indicate a direction of approach of the user 18. The authorization sensor 50 may be a Bluetooth low energy transceiver antenna module (BLEAM) that is mounted within an applique of one of the pillars of the vehicle 10, such as the B-pillar 34, for example.

In response to authenticating the user 18 within the threshold distance from the vehicle 10, the control module 48 may, in some embodiments, command the lighting modules 36 of the illuminating closure member system 20 to emit various lighting effects as the user 18 approaches the vehicle 10. In an embodiment, the lighting modules 36 are controlled to illuminate the beltline 22 of the vehicle 10 in a specific color and pattern (i.e., pulsing, chasing, etc.) A direction of an illuminating sequence of the illuminating closure member system 20 may be based on the direction of approach of the user 18. For example, as schematically indicated in FIG. 1, the light sources 42 of the lighting modules 36 of the illuminating closure member system 20 may be sequentially illuminated from point 1 (e.g., near the A-pillar 28) of the beltline 22 to point 2 (e.g., near the B-pillar 34) of the beltline 22, then from point 2 to point 3 (e.g., near the C-pillar 32) of the beltline 22, and then from point 3 to point 4 (e.g., near the D-pillar 30) of the beltline 22 when the user 18 is approaching from the front of the vehicle 10, may be sequentially illuminated from point 4 to point 3, then from point 3 to point 2, and then from point 2 to point 1 when the user 18 is approaching from the rear of the vehicle 10, may be sequentially illuminated from point 1 to point 2 to point 2.5 and from point 4 to point 3 to point 2.5 when the user 18 is approaching in a direction toward a side of the vehicle 10, and may be sequentially illuminated from point 2.5 to point 2 to point 1 and from point 2.5 to point 3 to point 4 when the user 18 is departing in a direction away from the side of the vehicle 10. In another embodiment, the rate at which the illumination sequentially moves along the beltline 22 is correlated to a speed of approach of the user 18.

The illuminating closure member system 20 may be further configured to start or stop the illuminating sequence at a location along the beltline 22 closest to where the user 18 has started or stopped during an approach. For example, when the user 18 stops at or near point 2 of the beltline 22, the control module 48 can command the light sources 42 of the illuminating closure member system 20 to sequentially illuminate only in the area between point 1 and point 2.

The positional sensor 52 may include a RADAR sensor, such as a RADAR sensor in the 77 gigahertz band (from 76 to 81 gigahertz), for example. The positional sensor 52 may be a single sensor or an arrangement of sensors or sensing devices. The positional sensor 52 may be mounted within one of the closure members 12, within the illuminating closure member system 20, or at various other exterior locations of the vehicle body 14. The positional sensor 52, in an exemplary embodiment, is a short-range sensor, such as a positional sensor that is capable of recognizing gestures made by a limb (e.g., a hand) of the user 18 when the user's limb is within a threshold distance (e.g., about 0.5 meters) from the positional sensor 52. The positional sensor 52 is configured to emit radio waves toward the user 18. Some of the radio waves may be reflected back to the positional sensor 52.

Based on the reflected signals, the control module 48 may recognize user gestures. For purposes of this disclosure, a user gesture refers to the user's limb being in a particular position relative to the vehicle 10. The user gesture could further require, in some examples, the user's limb to move in a certain way while being in a particular position. The user gesture may be used to control operation of the closure member 12. Exemplary user gestures include, but are not limited to, a pointed index finger being rotated in a clockwise direction relative to the user 18 for commanding the closure member 12 open, an open palm facing the vehicle 10 for commanding movement of the closure member 12 to stop, a hand having four cupped fingers for commanding the closure member 12 closed, a thumbs up position for commanding the closure member 12 locked, etc.

The control module 48 may, in an embodiment, wake the positional sensor 52 by commanding the positional sensor 52 to emit radio waves when the user 18 is identified within the threshold distance from the vehicle 10. In this way, the positional sensor 52 and control module 48 are configured to detect the user gestures only when the user 18 is within the threshold distance from the vehicle 10. Other users lacking the personal electronic device 58 and its associated authorization would not prompt the control module 48 to begin detecting the user gestures.

In response to detecting the personal electronic device 58 within the threshold distance, the control module 48 may also wake up various vehicle systems including the positional sensor 52, electronic latches of the actuator system 16 that hold the closure member 12 in a closed position, etc. After the positional sensor 52 awakes and detects a user gesture from the user 18, the control module 48 may command the actuator system 16 to reposition the closure member 12 in some way. In an embodiment, the control module 48 may, in response to receiving a user gesture indicating that the user 18 desires the closure member 12 to move from a closed position to an open position, transition the electronic latch to unlatch the closure member 12 from the vehicle body 14, and then command the actuator system 16 to open the closure member 12.

The control module 48 may, in another embodiment, segment the illumination of the illuminating closure member system 20 based on the swing or motion path and direction of travel of the closure member 12. For example, when the closure member 12 is a conventional, front hinged side door, the control module 48 may command the lighting modules 36 to illuminate a section of the beltline 22 from point 1 to point 2 or from point 2 to point 3. Where the closure member 12 is a coach style door (i.e., rear hinged side door), the control module 48 may command the lighting modules 36 to illuminate a section of the beltline 22 from point 2 to point 1 or from point 2 to point 3. Moreover, when the closure member 12 is a front or rear sliding door, the control module 48 may command the lighting modules 36 to illuminate a section of the beltline 22 from a front side of the closure member 12 toward a rear side of the closure member 12, or vice versa.

In another embodiment, the control module 48 may illuminate the beltline 22 (or sections thereof) via the illuminating closure member system 20 to provide a visual indication of a status of various closure member operations while the closure member 12 is already closed or while it is being opened or closed. For example, when the closure member 12 is opening/closing and no obstructions are detected, the control module 48 may command the lighting modules 36 to illuminate a section of the illuminating closure member system 20 that extends along the closure member 12 to illuminate and slowly flash in a first color (e.g., green). When the closure member 12 is accelerated open by the user 18, the control module 48 may command the lighting modules 36 to illuminate the section of the illuminating closure member system 20 associated with the closure member 12 to change the color to a second color (e.g., orange) and flash. When an object is detected (e.g., via the object detection sensor 60) in a motion path of the closure member 12, the control module 48 may command one or more of the lighting modules 36 of the illuminating closure member system 20 to transition from a first color (e.g., green) to a second color (e.g., orange). When the closure member 12 makes contact with an object/obstruction during opening/closing, the control module 48 may command one or more of the lighting modules 36 of the illuminating closure member system 20 to emit blinking red lights. When the closure member 12 and/or the actuator system 16 malfunctions and thus the closure member 12 cannot open or close, the control module 48 may command one or more of the lighting modules 36 of the illuminating closure member system 20 to emit solid red lights. The illuminating closure member system 20 may also emit specific lighting effects for indicating whether the closure member 12 is locked or unlocked. These are but non-limiting examples of the types of lighting effects that can be emitted by the illuminating closure member system 20 for indicating a status of the closure member 12.

In another embodiment, the control module 48 may control the intensity or brightness of the lighting effects emitted by the illuminating closure member system 20 when illuminating all or portions of the beltline 22 based on an extent of travel (e.g., between 10° and 70° relative to the vehicle body 14) of the closure member 12. The control module 48 may command one or more of the lighting modules 36 of the illuminating closure member system 20 to emit light at a progressively higher brightness as the angle of the extent of travel of the closure member 12 increases. For example, the control module 48 may command one or more of the lighting modules 36 to emit light at a first brightness when the closure member 12 is positioned at a 10° angle, may command the light at a second brightness that is greater than the first brightness when the closure member 12 is positioned at a 20° angle, may command the light at a third brightness that is greater than both the first brightness and the second brightness when the closure member 12 is positioned at a 30° angle, and so on up to the maximum extent of travel of the closure member 12 (e.g., approximately 70°).

The object detection sensor 60 may include a RADAR sensor, an ultrasonic sensor, a capacitive sensor, or any combinations of such sensors. The object detection sensor 60 may be a single sensor or an arrangement of sensors or sensing devices. The object detection sensor 60 may be mounted within one of the closure members 12, within a section of the illuminating closure member system 20, or at various other exterior locations of the vehicle body 14. The object detection sensor 60 is configured to detect objects or obstructions that may be in the swing or motion path of the closure member 12 when moving between closed and open positions.

In an embodiment, the control module 48 may linearly correlate a radial field of view of an object detected by the object detection sensor 60 to a linear representation of how far the closure member 12 can open before being stopped by the object. In response to receiving a signal from the object detection sensor 60 indicating that an object has been identified in the motion path of the closure member 12, the control module 48 may determine exact linear coordinates of the object and then command one or more of the lighting modules 36 to emit light for providing a positional reference of the detected object on the beltline 22 as the closure member 12 is moving. For example, when an object is detected at a 40° extent of travel of the closure member 12, the control module 48 may command one or more of the lighting modules 36 to emit light at a specific position along the beltline 22 for providing a visual representation of how far the closure member 12 can travel before being stopped by the object at the 40° extent of travel of the closure member 12.

Figure 4:
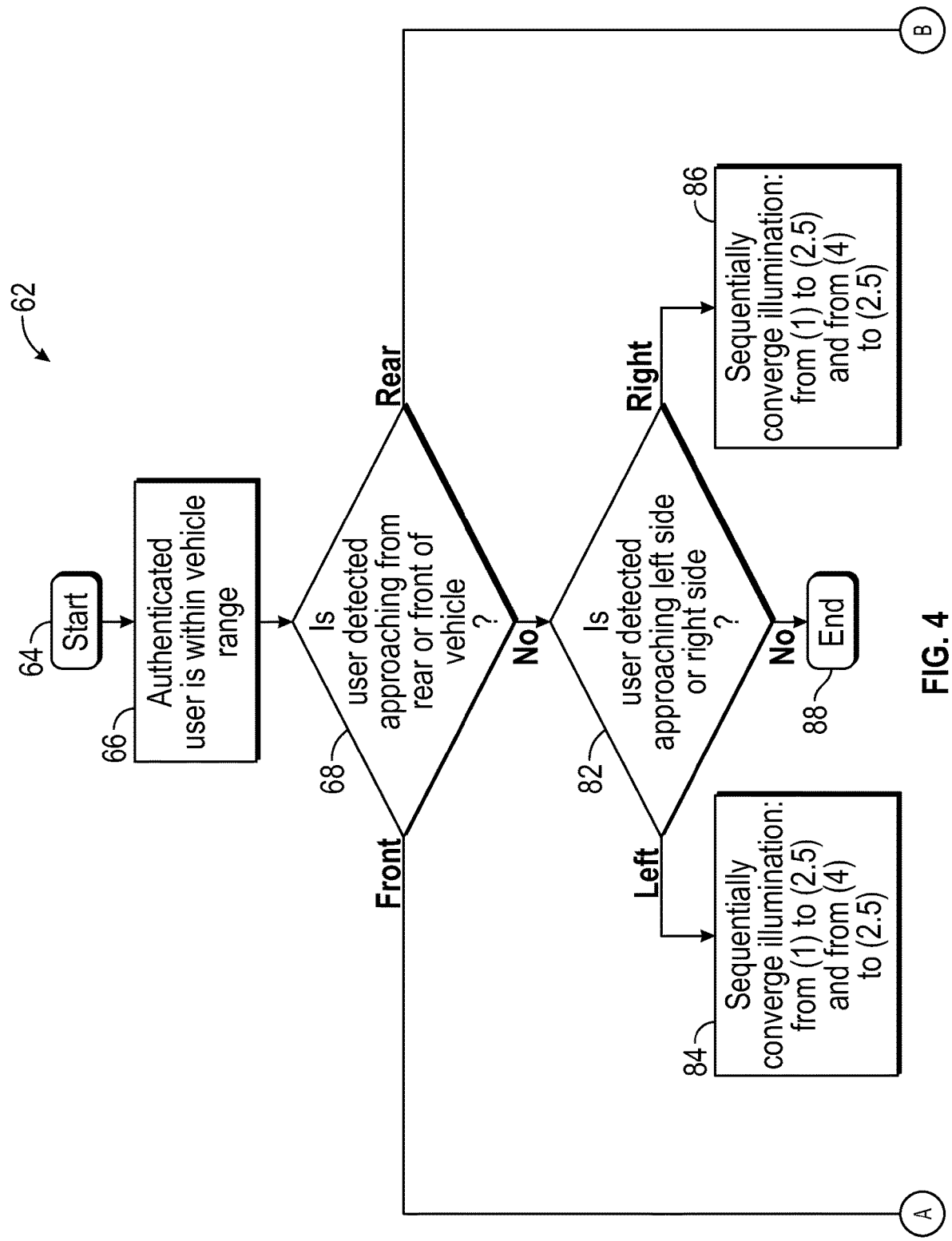
FIG. 4 schematically illustrates an exemplary control strategy for controlling an illuminating closure member system to provide an illuminated closure member beltline.

FIG. 4, with continued reference to FIGS. 1-3, schematically illustrates a control strategy 62 for controlling the illuminating closure member system 20 for illuminating the beltline 22 of the vehicle 10 when the user 18 is approaching the vehicle 10 (e.g., to provide a greeting or welcome lighting effect). In an embodiment, the control module 48 of the illuminating closure member system 20 is programmed with one or more algorithms adapted to execute the exemplary control strategy 62.

The exemplary control strategy 62 begins at block 64. At block 66, the control strategy 62 determines whether the user 18 is an authorized user who is within the threshold distance or range from the vehicle 10. In an embodiment, the authorization sensor 50 provides an input signal to the control module 48 when the authorized user 18 is detected within the threshold distance. The threshold distance may be about 2 meters from the vehicle 100, but could be defined at various other distances within the scope of this disclosure.

The control strategy 62 next proceeds to block 68 by determining whether the user 18 is approaching from either the front or rear of the vehicle 10. The control module 48 may determine the directional approach and speed of the approach of the authorized user 18 by analyzing the BLE signals communicated between the control module 48 and the personal electronic device 58, for example.

The control strategy 62 may proceed to block 70 when the user 18 is approaching from the front of the vehicle 10. At this step, the control strategy 62 determines whether the user 18 is approaching the front left side of the vehicle 10 or the front right side of the vehicle 10. If approaching the front left side, the control module 48 may command the illuminating closure member system 20 on the left side of the vehicle 10 to sequentially illuminate the beltline 22 from point 1 to point 4 at block 72. Alternatively, if approaching the front right side of the vehicle 10, the control module 48 may command the illuminating closure member system 20 on the right side of the vehicle 10 to sequentially illuminate the beltline 22 from point 1 to point 4 at block 74.

The control strategy 62 may alternatively proceed to block 76 when the authorized user 18 is approaching from the rear of the vehicle 10. At this step, the control strategy 62 determines whether the user 18 is approaching the rear left side of the vehicle 10 or the rear right side of the vehicle 10. If approaching the rear left side, the control module 48 may command the illuminating closure member system 20 on the left side of the vehicle 10 to sequentially illuminate the beltline 22 from point 4 to point 1 at block 78. Alternatively, if approaching the rear right side of the vehicle 10, the control module 48 may command the illuminating closure member system 20 on the right side of the vehicle 10 to sequentially illuminate the beltline 22 from point 4 to point 1 at block 80.

When a "NO" flag is returned at block 68, thus indicating that the user 18 is not approaching the vehicle 10 from either the front or the rear, the control strategy 62 may proceed to block 82 by determining whether the user 18 is instead approaching the vehicle 10 from either the left side or the right side of the vehicle 10. If approaching from the left side, the control module 48 may command the illuminating closure member system 20 on the left side of the vehicle 10 to sequentially illuminate the beltline 22 from point 1 to point 2.5 and from point 4 to point 2.5 at block 84. Alternatively, if approaching from the right side of the vehicle 10, the control module 48 may command the illuminating closure member system 20 on the right side of the vehicle 10 to sequentially illuminate the beltline 22 from point 1 to point 2.5 and from point 4 to point 2.5 at block 86. The control strategy 62 may end at block 88 if, at block 82, the control strategy 62 determines that the user 18 is not approaching from either the left side or the right side of the vehicle 10.

Optionally, the control strategy 62 may proceed to block 90 from any of blocks 72, 74, 78, or 80. The control strategy 62 may determine whether movement of the authorized user 18 has started or stopped at block 90. If so, the control module 48 may command the illuminating closure member system 20 to start or stop the illumination of the beltline 22 at the furthest extent of the discrete illuminating section of the illuminating closure member system 20 that is closest to the location the authorized user 18 has started or stopped at block 92. The control strategy 62 may then end at block 94.

Figure 5:
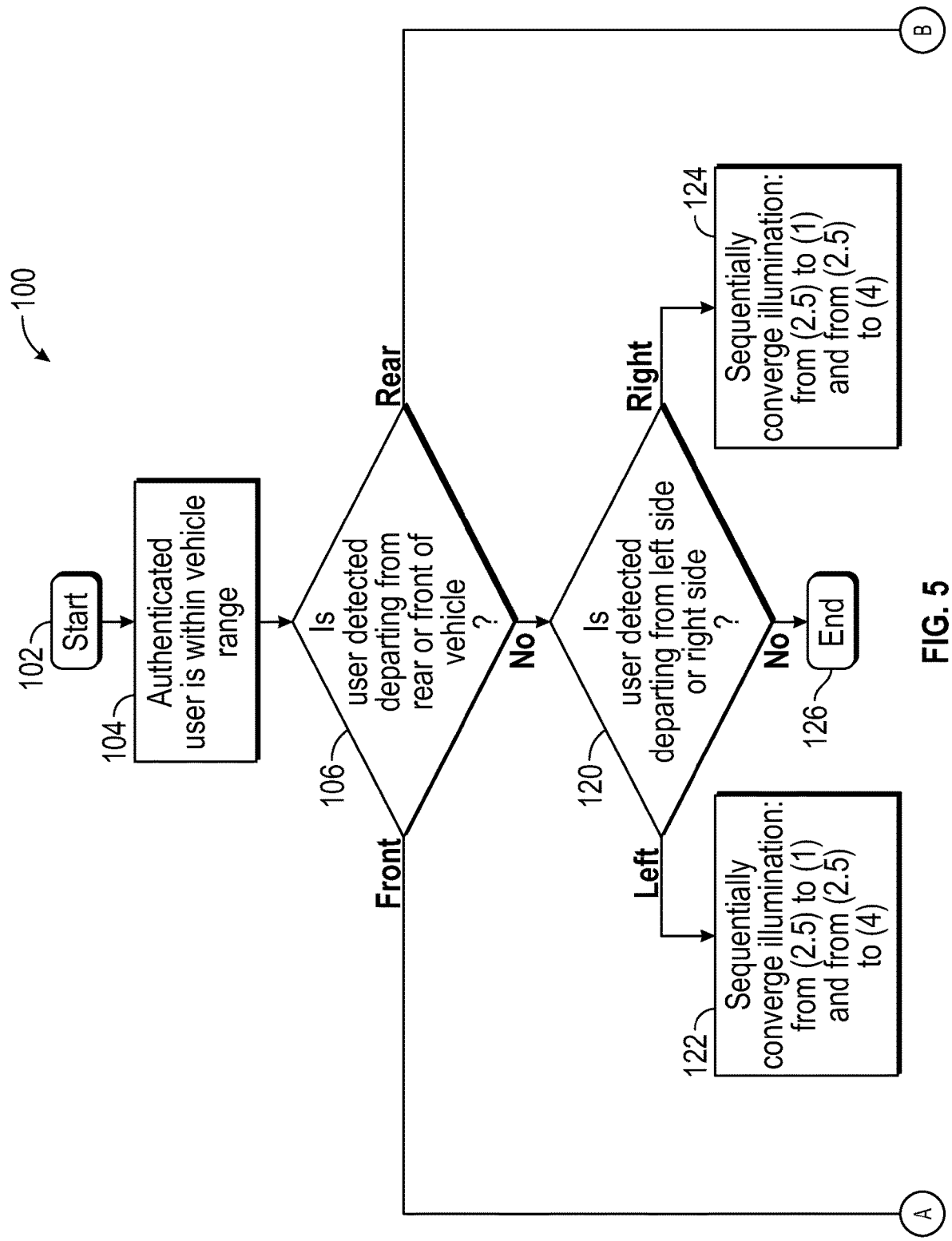
FIG. 5 schematically illustrates another exemplary control strategy for controlling an illuminating closure member system to provide an illuminated closure member beltline.
Figure 5:
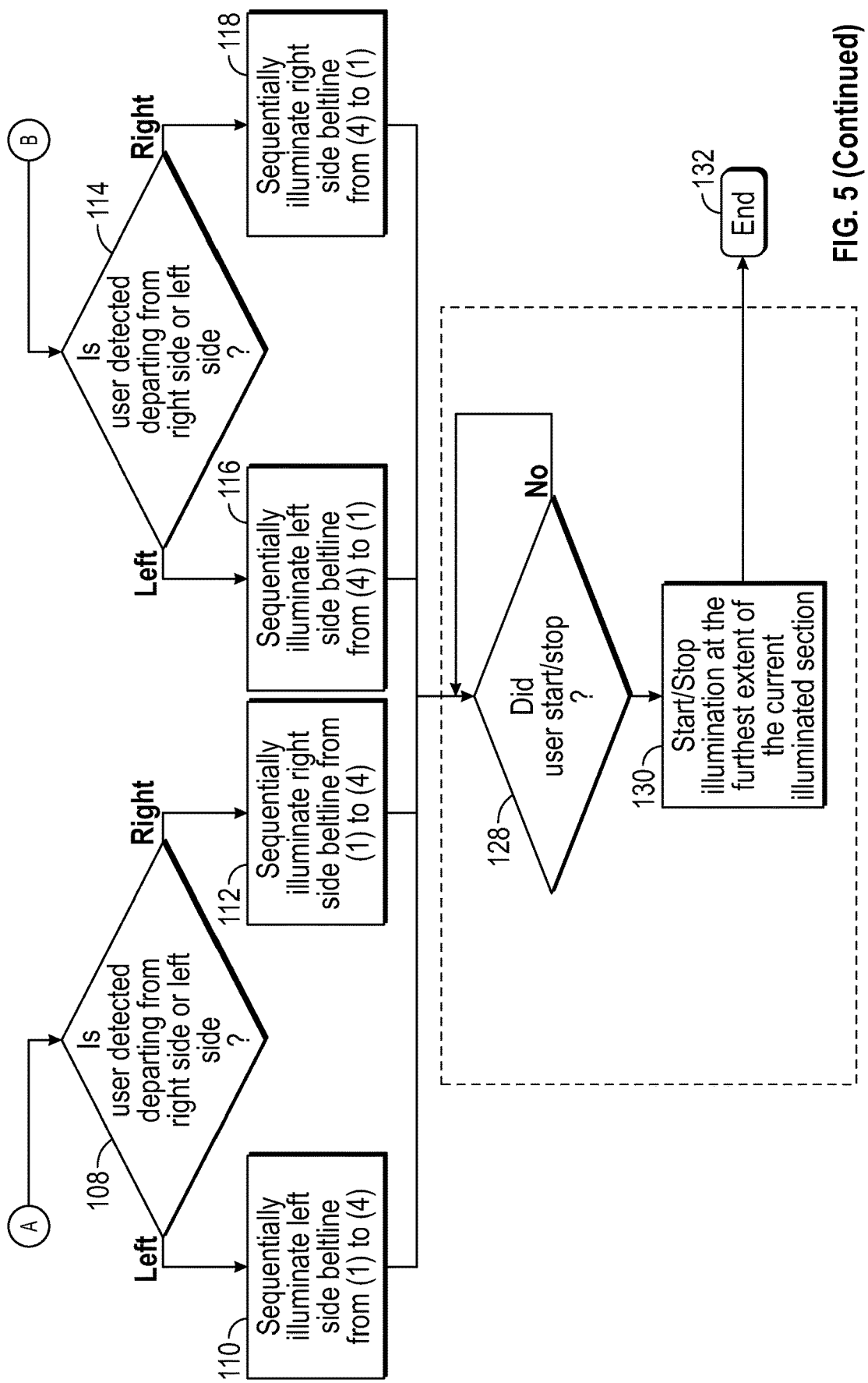

FIG. 5, with continued reference to FIGS. 1-3, schematically illustrates a control strategy 100 for controlling the illuminating closure member system 20 for illuminating the beltline 22 of the vehicle 10 when the user 18 is departing away from the vehicle 10 (e.g., to provide a farewell lighting effect). In an embodiment, the control module 48 of the illuminating closure member system 20 is programmed with one or more algorithms adapted to execute the exemplary control strategy 100.

The exemplary control strategy 100 begins at block 102. At block 104, the control strategy 100 determines whether the authorized user 18 is within a threshold distance from the vehicle 10. In an embodiment, the authorization sensor 50 provides an input signal to the control module 48 when the authorized user 18 is detected within the threshold distance. The threshold distance may be about 2 meters from the vehicle, but could be defined at other distances within the scope of this disclosure.

The control strategy 100 next proceeds to block 106 by determining whether the user 18 is departing toward either the front or rear of the vehicle 10. The control module 48 may determine the directional departure and speed of the departure of the user 18 by analyzing the BLE signals communicated between the control module 48 and the personal electronic device 58, for example.

The control strategy 100 may proceed to block 108 when the user 18 is departing away from the front of the vehicle 10. At this step, the control strategy 100 determines whether the user 18 is departing from the front left side of the vehicle 10 or the front right side of the vehicle 10. If departing from the front left side, the control module 48 may command the illuminating closure member system 20 on the left side of the vehicle 10 to sequentially illuminate the beltline 22 from point 1 to point 4 at block 110. Alternatively, if departing from the front right side of the vehicle 10, the control module 48 may command the illuminating closure member system 20 on the right side of the vehicle 10 to sequentially illuminate the beltline 22 from point 1 to point 4 at block 112.

The control strategy 100 may alternatively proceed to block 114 when the authorized user 18 is departing from the rear of the vehicle 10. At block 114, the control strategy 62 determines whether the authorized user 18 is departing from the rear left side of the vehicle 10 or the rear right side of the vehicle 10. If departing from the rear left side, the control module 48 may command the illuminating closure member system 20 on the left side of the vehicle 10 to sequentially illuminate the beltline 22 from point 4 to point 1 at block 116. Alternatively, if departing from the rear right side of the vehicle 10, the control module 48 may command the illuminating closure member system 20 on the right side of the vehicle 10 to sequentially illuminate the beltline 22 from point 4 to point 1 at block 118.

When a "NO" flag is returned at block 106, thus indicating that the user 18 is not departing the vehicle 10 from either the front or the rear, the control strategy 100 may proceed to block 120 by determining whether the user 18 is instead departing the vehicle 10 from either the left side or the right side. If departing from the left side, the control module 48 may command the illuminating closure member system 20 on the left side of the vehicle 10 to sequentially illuminate the beltline 22 from point 2.5 to point 1 and from point 2.5 to point 4 at block 122. Alternatively, if departing from the right side of the vehicle 10, the control module 48 may command the illuminating closure member system 20 on the right side of the vehicle 10 to sequentially illuminate the beltline 22 from point 2.5 to point 1 and from point 2.5 to point 4 at block 124. The control strategy 62 may end at block 126 if, at block 120, the control strategy 100 determines that the user 18 is not departing from either the left side or the right side of the vehicle 10.

Optionally, the control strategy 100 may proceed to block 128 from any of blocks 110, 112, 116, or 118. The control strategy 100 may determine whether movement of the user 18 has stopped at block 128. If so, the control module 48 may command the illuminating closure member system 20 to start or stop the illumination of the beltline 22 at the furthest extent of the discrete illuminating section of the illuminating closure member system 20 that is closest to the location the authorized user 18 has started or stopped at block 130. This may include illuminating one of the discrete illuminating sections of the illuminating closure member system 20 in any direction (e.g., from point 1 to point 2, from point 2 to point 1, etc.). The control strategy 62 may then end at block 132.

Figure 6:
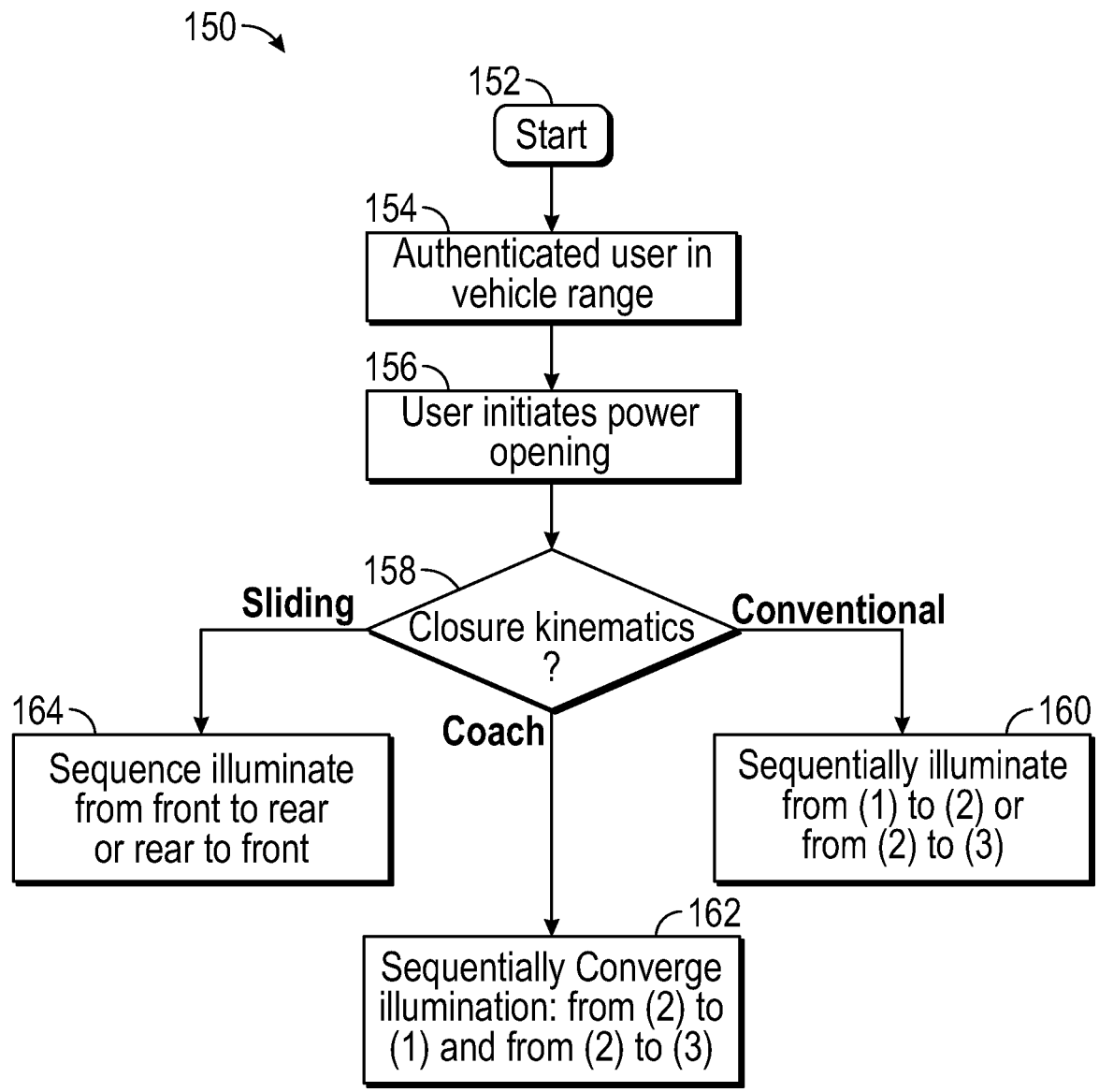
FIG. 6 schematically illustrates yet another exemplary control strategy for controlling an illuminating closure member system to provide an illuminated closure member beltline.

FIG. 6 with continued reference to FIGS. 1-3, schematically illustrates yet another control strategy 150 for controlling the illuminating closure member system 20 for segmenting the illumination of the beltline 22 of the vehicle 10 based on the kinematics of the closure member(s) 12. The control module 48 of the illuminating closure member system 20 may be programmed with one or more algorithms adapted to execute the exemplary control strategy 150.

The exemplary control strategy 150 begins at block 152. At block 154, the control strategy 150 determines whether the user 18 is within a threshold distance from the vehicle 10. In an embodiment, the authorization sensor 50 provides a signal to the control module 48 when the user 18 is detected within the threshold distance. The threshold distance may be about 2 meters from the vehicle 10, but could be defined at other distances within the scope of this disclosure.

The user 18 may initiate opening of one or more of the closure members 12 at block 156. The control strategy 150 may then proceed to block 158 by analyzing the kinematics (e.g., motion path and direction of travel) of the closure member 12 that has been actuated. When the control module 48 determines that a conventional, front hinged side door has been actuated, the control strategy 150 may proceed to block 160 and the control module 48 may command the illuminating closure member system 20 to sequentially illuminate the beltline 22 from point 1 to point 2 (or from point 2 to point 3). Where the control module 48 determines that a coach style door has been actuated, the control strategy 150 may proceed to block 162 and the control module 48 may command the illuminating closure member system 20 to sequentially illuminate the beltline 22 from point 2 to point 1 (or from point 2 to point 3). Finally, when the control module 48 determines that a sliding door has been actuated, the control strategy 150 may proceed to block 164 and the control module 48 may command the illuminating closure member system 20 to sequentially illuminate the beltline 22 from a front side of the closure member 12 toward a rear side of the closure member 12.

Figure 7A:
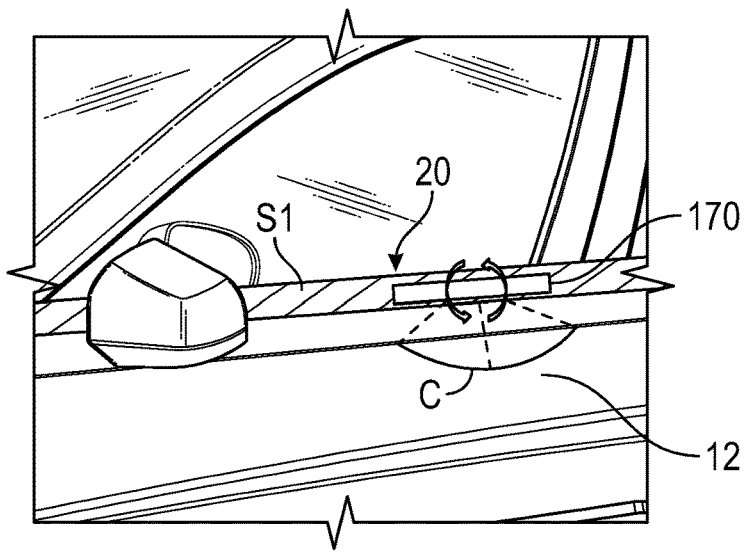
FIGS. 7A, 7B, and 7C schematically illustrate a phantom handle feature of an exemplary illuminating closure member system.
Figure 7B:
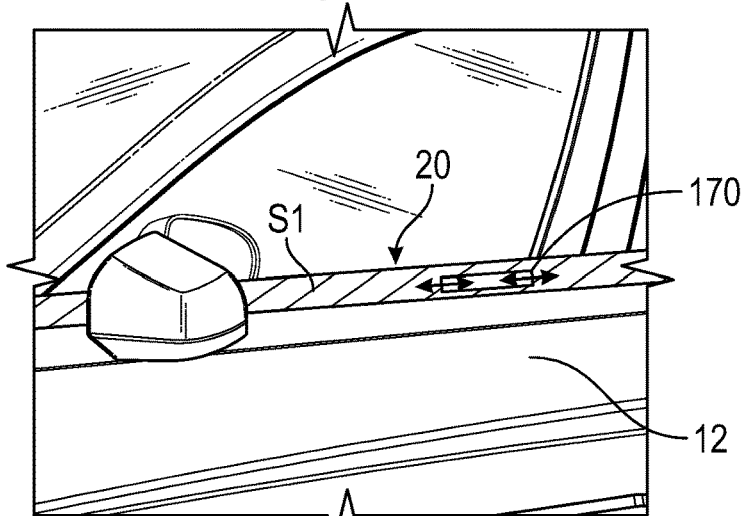
Figure 7C:
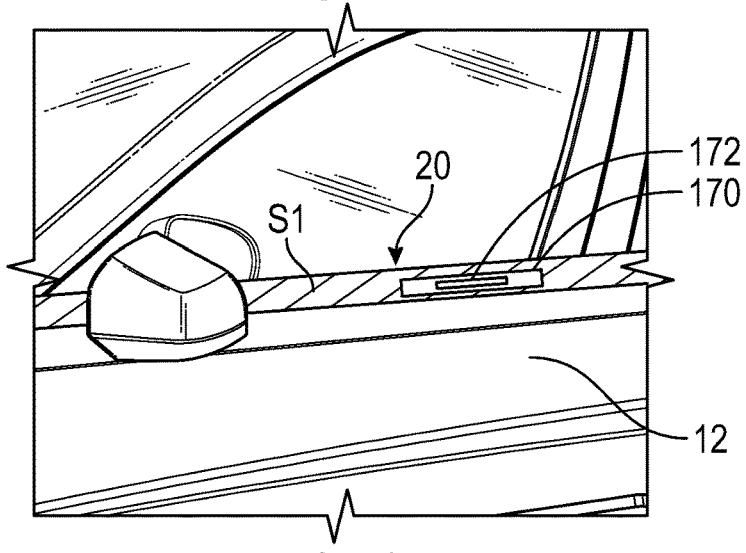

FIGS. 7A, 7B, and 7C illustrate additional lighting effects that can be emitted by the illuminating closure member system 20. Portions of the illuminating closure member system 20 may be illuminated to establish a phantom handle 170 within the discrete illuminating section S1 of the illuminating closure member system 20. In an embodiment, the phantom handle 170 is established by illuminating a section of the illuminated beltline 22 in a different shade of a color or a completely different color from the remaining portion of the discrete illuminating section S1. The phantom handle 170 indicates to authorized users the location where user gestures need to be made in order to be recognized by the positional sensor 52 for controlling the closure member 12 in a desired manner.

In an embodiment, the phantom handle 170 may be illuminated in a specific color C (e.g., red) when an incorrect gesture is detected by the positional sensor 52 (see FIG. 7A). In another embodiment, the phantom handle 170 may be increased or decreased in size in order to visually indicate the need for a larger or smaller user gesture to the authorized user (See FIG. 7B). In yet another embodiment, the phantom handle 170 may include a separate gesture area 172 that is automatically illuminated when the authorized user is detected within a threshold range from the vehicle 10 (see FIG. 7C).

Figure 8:
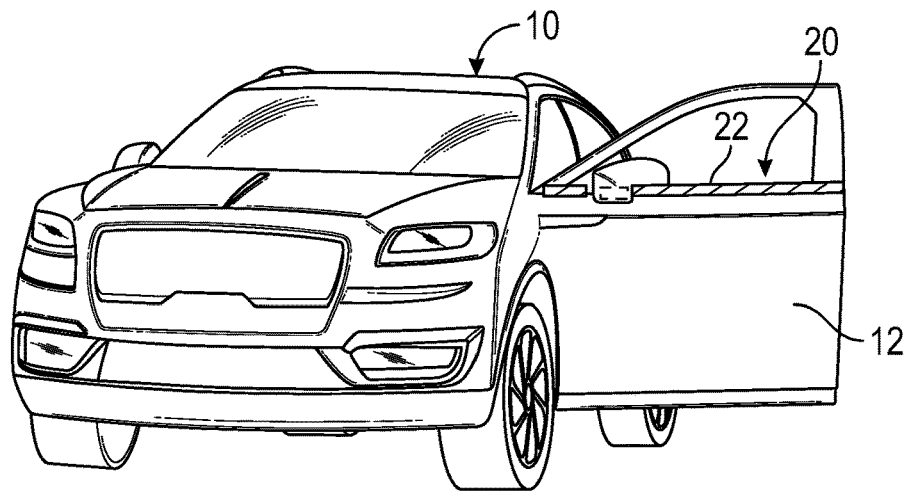
FIG. 8 schematically illustrates a closure member edge extent feature of an exemplary illuminating closure member system.
Figure 9:
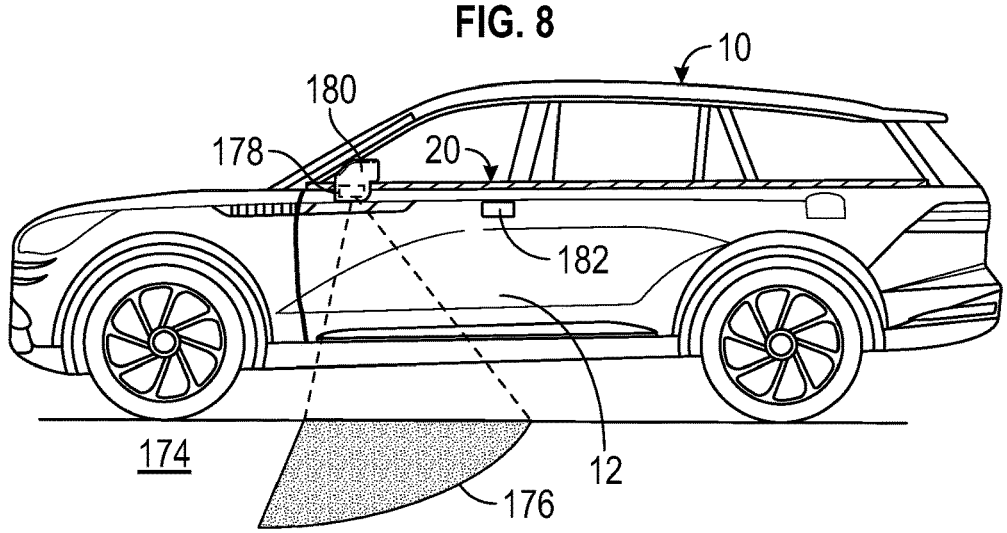
FIG. 9 schematically illustrates an exemplary lighting effect of an illuminating closure member system.

FIG. 8 illustrate another exemplary lighting effect that can be emitted by the illuminating closure member system 20. In this embodiment, the entire beltline 22 of an open closure member 12 may be automatically illuminated for indicating an overall extent of the closure member 12 during nighttime or low ambient light conditions. This particular lighting effect can be beneficial for reducing the likelihood of an authorized user accidently walking into the edge of the open closure member 12.

FIGS. 9-14 illustrate additional exemplary lighting effects that can be produced by the illuminating closure member system 20. In an embodiment, light from the illuminating closure member system 20 may be reflected off of a reflective panel 178 and onto a ground surface 174 near the vehicle 10 to provide an illuminated motion path 176 that provides a visual indication of an expected path of motion of the closure member 12 during its movement. In an embodiment, the reflective panel 178 is a digital micro-mirror device that is mounted within a side mirror 180 of the vehicle 10, a fixed handle 182 of the closure member 12, or at various other exterior mounting locations of the vehicle 10 that are capable of reflecting light from the illuminating closure member system 20.

The illuminated motion path 176 of the closure member 12 may include various colors and brightness levels and may include motion or moving lights. The control module 48 may dynamically change the size and shape of the illuminated motion path 176 during every approach by an authorized user. The illuminated motion path 176 may also be projected based on a direction of approach and a speed of the approach of the authorized user relative to the closure member 12.

Figure 10:
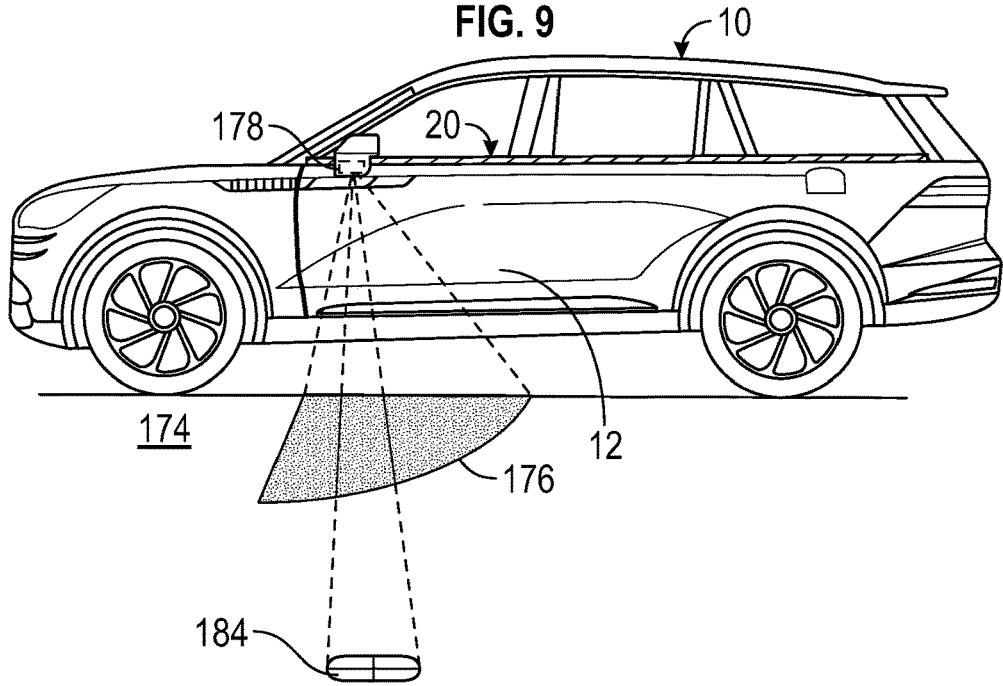
FIG. 10 schematically illustrates another exemplary lighting effect of an illuminating closure member system.

In an embodiment, the illuminated motion path 176 may include a logo 184 or some other symbol associated with the vehicle 10 (see FIG. 10). The logo 184 can provide a point of reference for the authorized user to stand to ensure that he/she stays clear of the motion path of the closure member 12.

Figure 11:
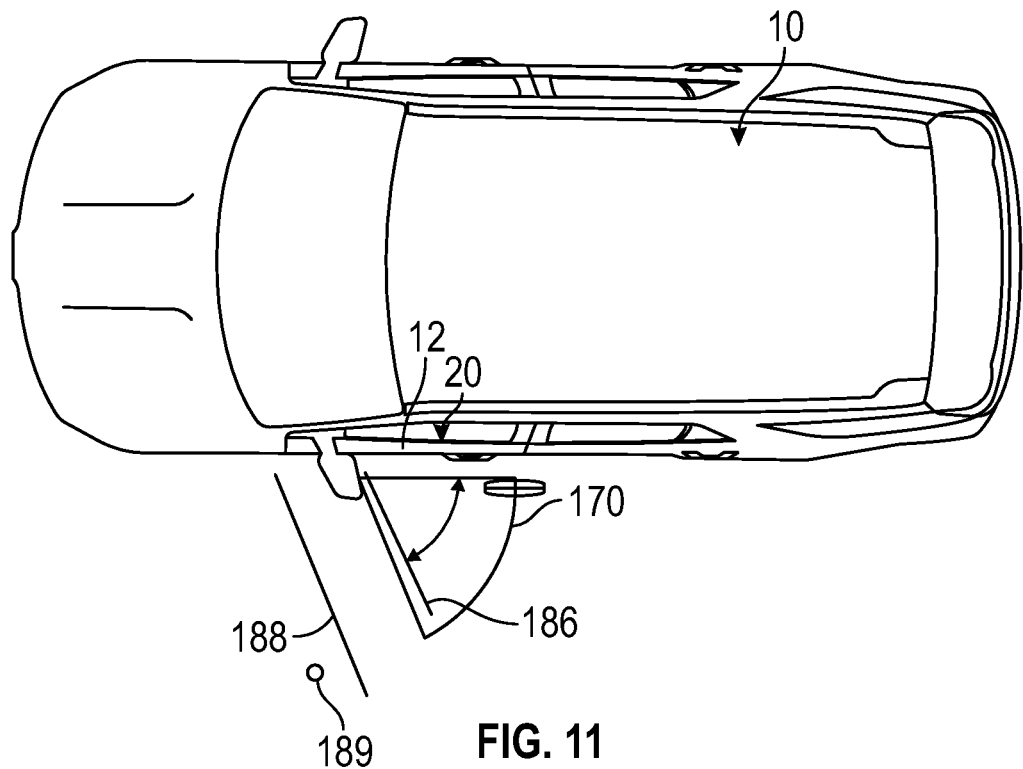
FIG. 11 schematically illustrates another exemplary lighting effect of an illuminating closure member system.

In another embodiment, the illuminated motion path 176 includes a sweeping illuminated line 186 that dynamically indicates the motion path of the closure member 12 and an illuminated line 188 that visually indicates a "full open" position of the closure member 12 (see FIG. 11). A spotlight 189, which may have the appearance of a colored dot or some other visual indication, may be illuminated adjacent to either the sweeping illuminated line 186 or the illuminated line 188 for indicating an obstruction in the motion path of the closure member 12. The sweeping illuminated line 186 may be illuminated to visually indicate the motion path just ahead of the position of the closure member 12 (see FIG. 12).

Figure 12:
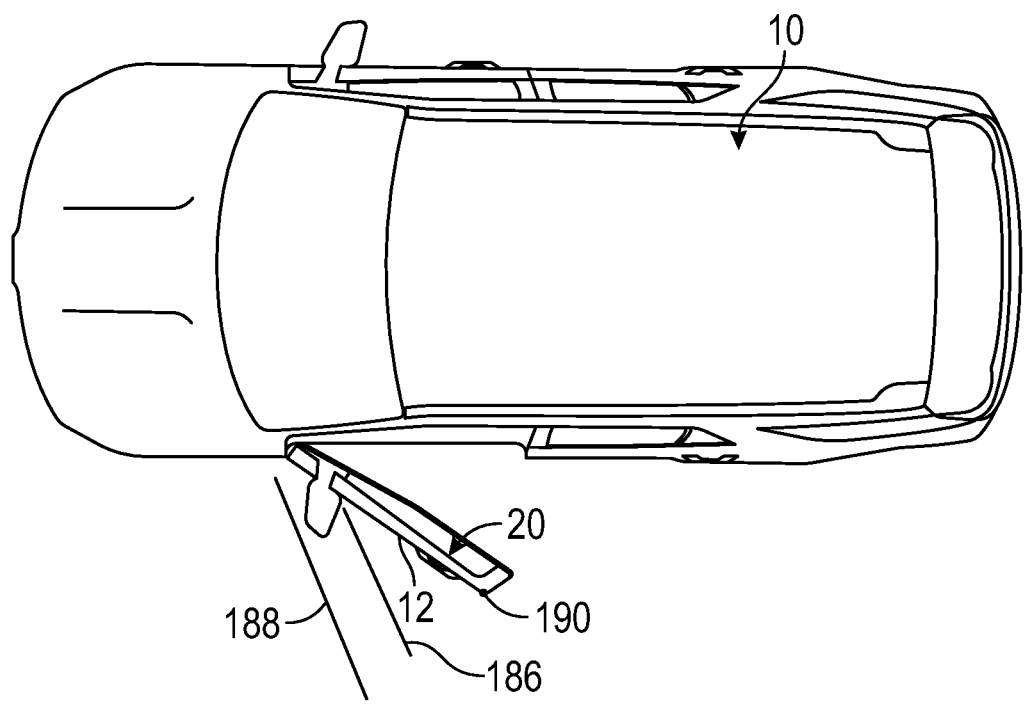
FIG. 12 schematically illustrates another exemplary lighting effect of an illuminating closure member system.

In another embodiment, a door extent lighting effect 190 may be provided in combination with the sweeping illuminated line 186 (see FIG. 12). The door extent lighting effect 190 allows the authorized user to visualize the edge or end of travel of the closure member 12 and could appears as a dot shape at the edge of the closure member 12.

Figure 13:
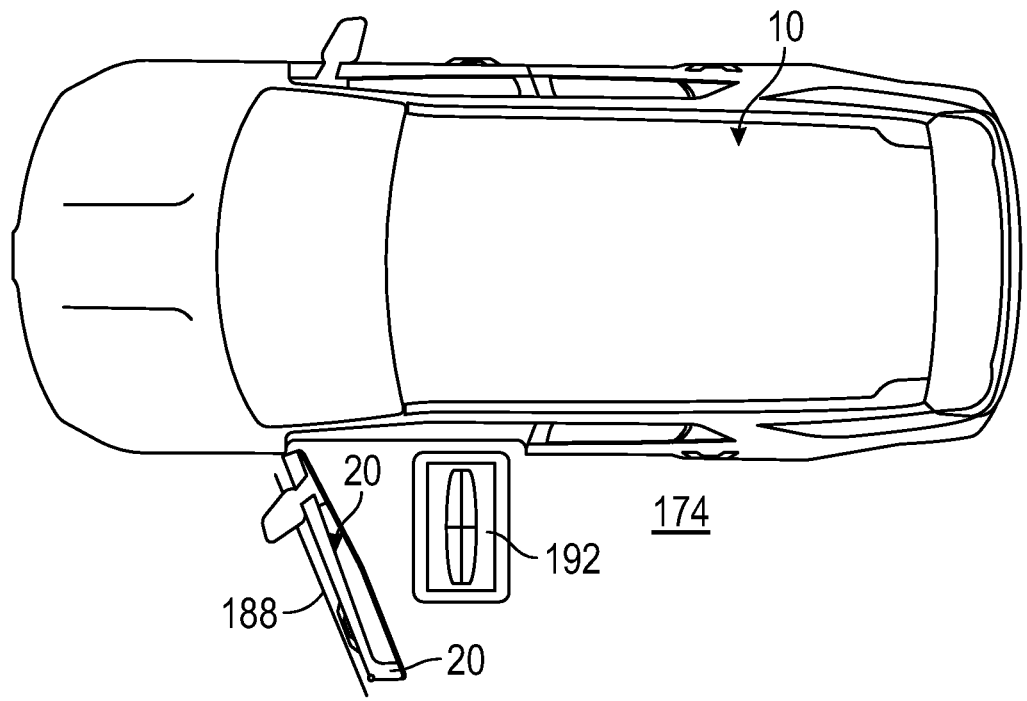
FIG. 13 schematically illustrates another exemplary lighting effect of an illuminating closure member system.

In another embodiment, upon movement of the closure member 12 to its full open position, the illuminating closure member system 20 may be commanded to emit an ornamental stepping pad 192 onto the ground surface 174 for indicating where the user should step for entering the vehicle 10 (see FIG. 13).

Figure 14:
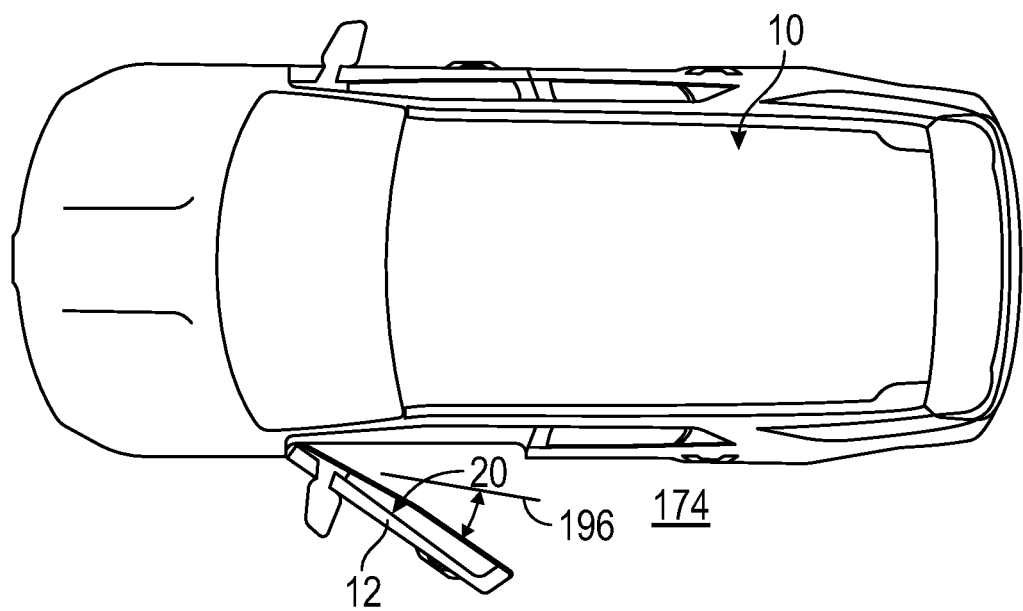
FIG. 14 schematically illustrates yet another exemplary lighting effect of an illuminating closure member system.

In yet another embodiment, during the opening and/or closing of the closure member 12, the illuminating closure member system 20 may be commanded to automatically project an illuminated line 196 or other indication onto the ground surface 174 when an object is detected within the motion path of the closure member 12 (see FIG. 14).

The illuminating closure member systems described herein are capable of communicating a variety of exterior lighting effects to authorized users of the vehicle as part of an illuminated beltline feature, a closure member operation status indication feature, an illuminated closure member motion path indication feature, etc. The illuminating closure member systems of this disclosure therefore provide elegant, visually distinctive and pleasing exterior lighting effects to users as they approach and depart from the vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An illuminating closure member system, comprising:
   a closure member; and
   a discrete illuminating section secured relative to the closure member and including a lighting module configured to illuminate a beltline of the closure member,
   wherein the lighting module is configured to provide an illuminating sequence along the beltline,
   wherein a direction of the illuminating sequence along the beltline is based on a direction of an approach of an authorized user.

2. The illuminating closure member system as recited in claim 1, wherein the closure member is a vehicle side door.

3. The illuminating closure member system as recited in claim 1, comprising a control module configured to control the lighting module for illuminating the beltline when the authorized user is within a threshold range from the closure member.

4. The illuminating closure member system as recited in claim 3, comprising an authorization sensor in communication with the control module and configured to communicate with a personal electronic device of the user when the personal electronic device is within the threshold distance.

5. The illuminating closure member system as recited in claim 3, comprising a positional sensor in communication with the control module and configured to detect a user gesture from the authorized user, and further comprising an object detection sensor in communication with the control module and configured to detect an object in a motion path of the closure member.

6. The illuminating closure member system as recited in claim 1, wherein a rate at which the illuminating sequence moves along the beltline is based on a speed of the approach of the authorized user.

7. The illuminating closure member system as recited in claim 1, comprising an actuator system configured to move the closure member between a closed position and an open position, wherein the actuator system includes a power door actuator.

8. The illuminating closure member system as recited in claim 1, wherein the illuminating sequence includes a pulsing or chasing pattern.

9. The illuminating closure member system as recited in claim 1, wherein the discrete illuminating section includes the lighting module and a thermal transfer device positioned between the lighting module and a metallic component of the closure member, wherein the thermal transfer device includes a thermally conductive adhesive pad that facilitates heat transfer between a printed circuit board (PCB) of the lighting module and the metallic component.

10. The illuminating closure member system as recited in claim 1, wherein the lighting module is configured to start or stop the illuminating sequence at a location along the beltline closest to where the authorized user has started or stopped during the approach.

11. The illuminating closure member system as recited in claim 1, wherein the lighting module is configured to illuminate the beltline in order to indicate an operation status of the closure member.

12. The illuminating closure member system as recited in claim 1, wherein the lighting module is configured to project an illuminated motion path that provides a visual indication of an expected path of motion of the closure member.

13. The illuminating closure member system as recited in claim 1, wherein the lighting module is configured to provide the illuminating sequence at a first brightness when the closure member is positioned at a first angle relative to a vehicle body and is further configured to provide the illuminating sequence at a second brightness that is greater than the first brightness when the closure member is positioned at a second angle relative to the vehicle body, wherein the second angle is larger than the first angle.

14. The illuminating closure member system as recited in claim 9, wherein the PCB includes a glass-reinforced epoxy laminate panel that is positioned in contact with the thermal transfer device.

15. A vehicle, comprising:
a vehicle body;
a closure member movably mounted relative to the vehicle body;
an illuminating closure member system mounted to the closure member; and
a control module configured to control the illuminating closure member system for producing at least one of a beltline lighting effect,
wherein the at least one beltline lighting effect includes an illuminating sequence provided along the beltline of the closure member,
wherein a direction of the illuminating sequence along the beltline is based on a direction of an approach of an authorized user.

16. The vehicle as recited in claim 15, wherein the illuminating closure member system includes a lighting module and a thermal transfer device disposed between the lighting module and a metallic component of the closure member, wherein the lighting module includes a diffuser lens, a plurality of light sources, and a printed circuit board (PCB), and the thermal transfer device includes a thermally conductive adhesive pad that facilitates heat transfer between the PCB and the metallic component.

17. The vehicle as recited in claim 16, wherein the control module is configured to control the lighting module for producing the beltline lighting effect when the authorized user is within a threshold range from the vehicle, and comprising an authorization sensor configured to communicate an input signal to the control module when the authorized user is within the threshold range.

18. The vehicle as recited in claim 15, comprising a reflective panel configured to reflect a motion path lighting effect produced by the illuminating closure member system onto a ground surface adjacent the vehicle.

19. The vehicle as recited in claim 15, wherein a motion path lighting effect produced by the illuminating closure member system includes a logo, a sweeping illuminated line, or a colored illuminated line.

20. A method, comprising:
automatically illuminating at least a portion of a beltline of a closure member of a vehicle with an illuminating closure member system when an authorized user is within a threshold distance of the vehicle,
wherein illuminating the portion of the beltline includes providing an illuminating sequence along the beltline,
wherein a direction of the illuminating sequence along the beltline is based on a direction of an approach of the authorized user.

* * * * *